United States Patent [19]
Hoffman

[11] 3,884,985
[45] May 20, 1975

[54] METHOD OF SEPARATING SULFUR MONOCHLORIDE FROM CARBON TETRACHLORIDE

[75] Inventor: Kenneth P. Hoffman, Niagara Falls, N.Y.

[73] Assignee: Stauffer Chemical Company, Westport, Conn.

[22] Filed: Oct. 15, 1973

[21] Appl. No.: 406,457

[52] U.S. Cl. .............................. 260/664; 423/469
[51] Int. Cl. ............................................. C07c 17/38
[58] Field of Search .................... 260/664; 423/469

[56] References Cited
UNITED STATES PATENTS

| | | | |
|---|---|---|---|
| 1,817,123 | 8/1931 | Brallier et al. | 260/664 |
| 2,016,804 | 8/1935 | Nichols | 260/664 |

*Primary Examiner*—D. D. Horwitz

[57] ABSTRACT

A method for recovering sulfur monochloride from a process for preparing carbon tetrachloride by the chlorination of carbon disulfide. The method comprises contacting the underflow product from a distillation step, in which carbon tetrachloride is separated from sulfur monochloride, with a substantially dry inert gas, at an elevated temperature to produce a sulfur chloride product having a substantially reduced carbon tetrachloride content.

7 Claims, 1 Drawing Figure

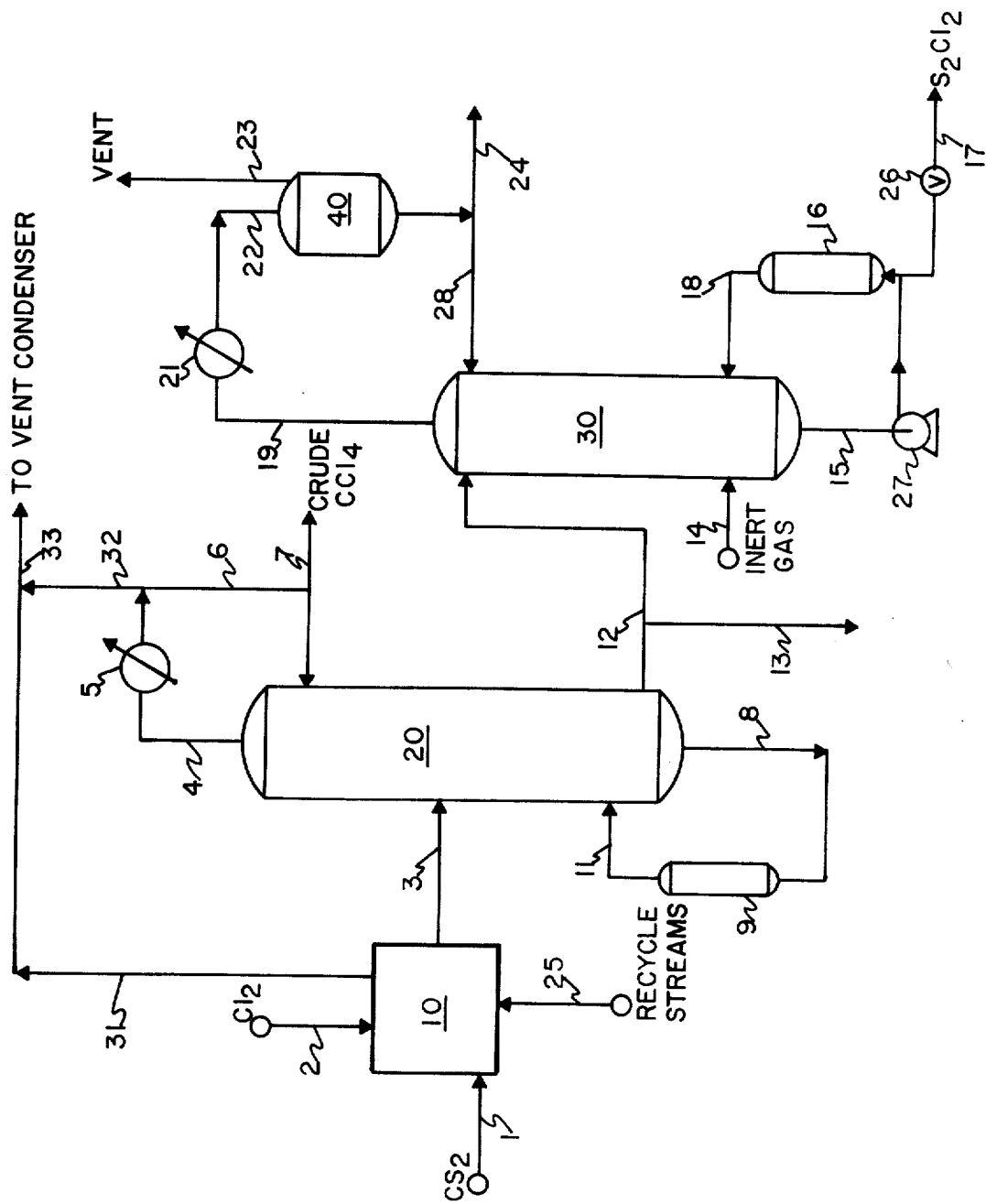

METHOD OF SEPARATING SULFUR MONOCHLORIDE FROM CARBON TETRACHLORIDE

BACKGROUND OF THE INVENTION

This invention relates to a method for preparing sulfur chloride. More particularly, this invention is a method for recovering sulfur monachloride as a valuable byproduct from a carbon tetrachloride process.

Processes for preparing carbon tetrachloride are described in U.S. Pat. Nos. 1,817,123 and 3,081,359, and are characterized by certain steps wherein carbon disulfide is reacted with chlorine or chlorinating agents to produce a reaction mixture containing major amounts of carbon tetrachloride ($CCl_4$) and sulfur monochloride ($S_2Cl_2$), and minor amounts of sulfur dichloride ($SCl_2$) and carbon disulfide ($CS_2$).

As currently practiced in the art, the reaction mixture containing carbon tetrachloride, sulfur monochloride, carbon disulfide, and sulfur dichloride is separated in a distillation zone into an overhead crude carbon tetrachloride fraction containing the lower boiling point materials, that is, carbon tetrachloride, carbon disulfide, and sulfur dichloride and an underflow containing sulfur monochloride and carbon tetrachloride. The sulfur monochloride is usually further reacted with carbon disulfide to form sulfur and carbon tetrachloride. The volatile products are separated from the sulfur, and the sulfur is purified and may be reused to produce additional carbon disulfide.

Sulfur monochloride is a valuable material of commerce. It is used as a chlorinating agent in many commercial chlorination reactions. Reactions in which sulfur monochloride can be used as the chlorinating agent are disclosed in U.S. Pat. No. 3,089,890.

A large amount of carbon tetrachloride is produced in the United States by the chlorination of carbon disulfide. The sulfur monochloride which is generated in the process is not usually recovered as a product. Commercial recovery is usually not considered due to the contamination with relatively high levels of carbon tetrachloride. Separation of carbon tetrachloride from sulfur monochloride to produce a sulfur monochloride product having low concentrations of impurities can not be accomplished under ordinary distillation conditions. At the temperatures required for distillation the sulfur monochloride disproportionates, to produce sulfur which contaminates the product.

The object of the present invention is to provide a commercial grade sulfur monochloride from a crude sulfur monochloride contaminated with carbon tetrachloride. It is a further object of the present invention to produce a commercial grade sulfur monochloride byproduct from a process for preparing carbon tetrachloride by the chlorination of carbon disulfide. It is a further object of the present invention to produce sulfur monochloride product containing less than about 0.5% carbon tetrachloride.

BRIEF SUMMARY OF THE INVENTION

According to the present invention, carbon tetrachloride and other low boiling point impurities can be separated from sulfur monochloride by contacting the sulfur monochloride with a substantially dry inert gas at an elevated temperature.

The sulfur monochloride is preferably sulfur monochloride separated from a reaction mixture wherein carbon tetrachloride is produced from carbon disulfide. The refined sulfur monochloride product usually contains more than about 95% sulfur monochloride and preferably between about 97 and 99% sulfur monochloride. The major portion of the remaining contaminants being surfur.

DETAILED DESCRIPTION OF THE INVENTION

In a process for producing carbon tetrachloride from carbon disulfide, the carbon disulfide is reacted with chlorine or a chlorinating agent to form a mixture containing sulfur monochloride, carbon tetrachloride and small amounts of sulfur dichloride and carbon disulfide.

The carbon tetrachloride, carbon disulfide and sulfur dichloride are separated from the sulfur monochloride in a distillation zone. Complete separation of the sulfur monochloride from the carbon tetrachloride does not occur in the distillation zone. The major portion of the carbon tetrachloride and lower boiling point carbon disulfide and sulfur dichloride are taken as the overhead product from the distillation zone. The higher boiling point sulfur monochloride is removed as underflow from the distillation zone and usually contains from about 2 to about 20% carbon tetrachloride and small amounts of sulfur.

The temperature in the distillation zone is maintained low, and therefore, a poor separation is accomplished between the carbon tetrachloride and sulfur monochloride. The sulfur monochloride tends to disproportionate into sulfur dichloride and sulfur at elevated temperature and to react with the carbon tetrachloride to form additional low boiling point materials such as carbon disulfide and sulfur dichloride. The sulfur dichloride and carbon disulfide which is removed overhead with the carbon tetrachloride contaminates the carbon tetrachloride. The sulfur passes through the bottom of the column as a contaminant in the sulfur monochloride.

The crude carbon tetrachloride from the distillation zone contains small amounts of carbon disulfide and sulfur dichloride. The carbon disulfide and sulfur dichloride must be separated from the carbon tetrachloride. The separation is usually accomplished by a frationation step wherein the sulfur dichloride and carbon disulfide are taken overhead as low boiling point components and the carbon tetrachloride is removed from the bottom of the column as the high boiling point component. During the distillation, the sulfur dichloride can react with the carbon disulfide or disproportionate to form sulfur monochloride and contaminate the carbon tetrachloride product removed from the bottom of the column. Any sulfur compounds which remain in the carbon tetrachloride must be removed, usually by neutralization and washing. The sulfur and chlorine values are lost and the water pollution potential for the process is increased.

The distillation step which separates the carbon tetrachloride from the sulfur monochloride is usually accomplished within a temperature range to balance the amount of carbon tetrachloride which remains with the sulfur monochloride and to minimize the amount of sulfur monochloride which disproportionates to form sulfur dichloride, and the amount of carbon tetrachloride which reverts to low point materials.

In the prior art processes, the sulfur monochloride which has been separated from the carbon tetrachloride is usually reacted with additional carbon disulfide to form sulfur and carbon tetrachloride. The sulfur is separated from the carbon tetrachloride, and treated to remove unreacted sulfur monochloride. The sulfur can be further purified and recycled to the process for making carbon disulfide or used in some other manner.

If it is necessary to produce sulfur chloride, the sulfur separated from the carbon tetrachloride was further treated to remove impurities and was chlorinated in a separate step to form sulfur monochloride.

The present process provides a commercially acceptable sulfur monochloride product by separating the carbon tetrachloride from the sulfur monochloride at a temperature at which disproportionation and reversion of the carbon tetrachloride and sulfur chloride is minimized and substantially reduced.

The crude mixture of sulfur monochloride and carbon tetrachloride is contacted with a substantially dry, inert gas at an elevated temperature whereby the carbon tetrachloride and any other low boiling point impurities are stripped from the sulfur monochloride to form the sulfur monochloride product. The sulfur monochloride product can contain less than 0.5% carbon tetrachloride and preferably less than 0.2% carbon tetrachloride. The carbon tetrachloride content in the sulfur monochloride product is dependent upon the purity required for the use of the sulfur monochloride, and can be less than about 0.02 percent.

Elevated temperature as used herein refers to temperatures between about 75° and about 150°C.; and preferably between about 85° and about 138°C. Higher temperatures can be used but the sulfur monochloride will tend to disproportionate to form sulfur and sulfur dichloride. If higher amounts of sulfur in the sulfur monochloride product are not objectionable, higher temperatures can be utilized.

A substantially dry, inert gas is used to strip the low boiling point contaminates from the sulfur monochloride product. Substantially dry inert gas is required since the sulfur monochloride reacts with moisture. The moisture in the gas stream introduces additional sulfur into the product and produces sulfur dioxide and hydrogen chloride. The sulfur dioxide and hydrogen chloride must be scrubbed from the vent stream and increases the air and water pollution problems associated with the process. Small amounts of moisture, however, can be tolerated.

Inert gases such as nitrogen are suitable stripping agents in the process. Air can also be utilized as a stripping agent since it is substantially inert but tends to discolor the product sulfur monochloride. If a slightly darker colored material is not objectionable air can be utilized as the stripping agent. Precautions to prevent ignition must be taken if air is utilized.

The sulfur monochloride containing carbon tetrachloride is preferably contacted in a countercurrent manner by the inert gas. A packed or a tray column has been found suitable. Although countercurrent contacting in a column is the preferred manner for carrying out the process of the present invention, cocurrent contacting is suitable. Other contacting means such as falling film contactors, spray contactors and sparging gas through bodies of liquid are slso suitable for contacting the sulfur monochloride with the substantially dry inert gas. The method of contacting merely effects the efficiency of the operation and the amount of carbon tetrachloride which can be separated from the sulfur monochloride by given volumes of gas The contacting method chosen will be determined by the required efficiency of the operation and the level to which the the carbon tetrachloride must be removed from the sulfur monochloride product. The method is particularly valuable in that it can provide a sulfur monochloride product having a low level of sulfur contamination. The temperature at which the carbon tetrachloride can be stripped from the sulfur monochloride can be maintained at a relatively low level and disproportionation of the sulfur monochloride can be minimized. The sulfur contamination of the product is due mainly to the the sulfur present in the carbon tetrachloride contaminated feed stream.

In addition to the relatively low temperature levels required to reduce the carbon tetrachloride in the sulfur monochloride to low levels, the time at which the sulfur monochloride must be maintained at the elevated temperature can be minimized by choice of a suitable contacting means. The short time periods at the elevated temperature minimizes the disproportionation of the sulfur monochloride.

The contacting apparatus is usually operated in conjunction with means to supply heat to the sulfur monochloride to provide the elevated temperature required in the present process.

The process can be operated continuously or batchwise. It is preferred that the process be operated continuously in a countercurrent contacting zone.

The process of the present invention will now be illustrated by reference to the attached FIGURE.

Carbon disulfide enters reaction zone 10 through line 1. Chlorine gas enters reaction zone 10 through line 2 in an approximate ratio of about 3 moles of chlorine per mole of carbon disulfide. Reaction zone 10 has means for maintaining the reaction temperature, such as reflux condensers or cooling coils and means for separating any inert and unreacted gases from the reaction mixture. Inert and unreacted gases pass out of reaction zone 10 through line 31 and line 33 to a refrigerated vent condenser. Recycle streams containing sulfur monochloride, sulfur dichloride, carbon tetrachloride and carbon disulfide can be returned to reaction zone 10 through line 25 to provide additional carbon tetrachloride. A mixture containing major amounts of carbon tetrachloride and sulfur monochloride and minor amounts of carbon disulfide and sulfur dichloride leave reaction zone 10 through line 3 and enter distillation column 20.

In distillation column 20, a crude carbon tetrachloride product is separated from a crude sulfur monochloride product. Distillation column 20 can be a standard multitray or packed distillation column wherein a vapor stream containing major amounts of carbon tetrachloride is passed overhead through line 4 and condensed in condenser 5, and returns through line 6 as reflux to column 20. The crude carbon tetrachloride product containing carbon disulfide and sulfur dichloride, is removed from the column through line 7.

The crude carbon tetrachloride can be further fractionated to separate the carbon disulfide and sulfur dichloride from the carbon tetrachloride.

Heat is supplied to distillation column 20 by means of reboiler 9 to provide boilup for reflux and product separation. Reboiler 9 receives the column underflow liquid containing sulfur monochloride and carbon tetrachloride through line 8 and returns a vapor and liquid mixture to column 20 through line 11. An underflow stream containing sulfur monochloride and from about 2 to about 20% carbon tetrachloride is removed from column 20 through line 12.

A portion of the carbon tetrachloride-sulfur monochloride mixture in line 12 can be removed from the system through line 13 and further reacted with additional carbon disulfide to form sulfur and carbon tetrachloride in reaction means not shown. The mixture containing sulfur monochloride, carbon tetrachloride and usually small amounts of sulfur which is to be purified passes to stripping column 30 through line 12. Line 12 can enter the column at the top or can enter the column at a point below the top tray or packing to provide a rectification section to minimize the amount of sulfur chloride stripped from the column and increase the amount removed from the bottom of the column. Substantially dry inert gas enters stripping column 30 below the level of liquid in the base of the column through line 14. The substantially dry inert gas is passed countercurrent to the liquid sulfur monochloride-carbon tetrachloride mixture which passes down through column 30. Column 30 is preferably a packed column or a multitray column designed for intimate contact between the inert gas and the sulfur monochloride.

A mixture of inert gas and low boiling point materials is removed from column 30 through line 19. The condensable materials are condensed in condenser 21 and passed to separator 40 through line 22. Noncondensable inert gas is vented from separator 40 through line 23. A mixture of carbon tetrachloride, sulfur monochloride and other low boiling point materials is removed from separator 40 through line 24. A portion of the liquid mixture for separator 40 can be returned to column 30 as reflux through line 28. The mixture of carbon tetrachloride, sulfur monochloride and other low boiling point materials in line 24 can be returned to the initial reaction zone or mixed with the composition in line 13 and contacted with additional carbon disulfide to form carbon tetrachloride which can be recovered from the process.

Heat is supplied to stripping column 30 by circulation of the composition in the bottom of the column through line 15 and heat exchanger 16 by pump 27. A heated liquid mixture returns to column 30 through line 18. The inert gas from line 14 to column be bubbled through a level of material in the bottom of column 30. The product sulfur monochloride is removed from the process through valve 26 in line 17. The level of liquid in column 30 is controlled by control valve 26 in line 17.

The sulfur monochloride product usually contains less than about 0.5% carbon tetrachloride and most preferably less than 0.2%. Sulfur monochloride containing less than 0.02% carbon tetrachloride can be produced by the process.

The temperature at the top of stripping column 30 can vary between about 75° and about 130°C. The temperature at the bottom of stripping column 30 varies between about 90° and about 150°C. and usually from about 90° to about 138°C. The temperature in the bottom of the stripping column 30 is preferably maintained below the boiling point of sulfur monochloride at the pressure at the bottom of the column.

The product sulfur monochloride is usually a light colored product containing minor amounts of sulfur and carbon tetrachloride. The concentration of sulfur and carbon tetrachloride can be controlled to some extent by the degree of heating, the ratio of stripping gas to sulfur monochloride and the temperature of the initial separation between the carbon tetrachloride and sulfur monochloride occurring in distillation column 20.

The embodiment of the carbon tetrachloride process presented in the FIGURE is for illustrative purposes to indicate a point in a process wherein the sulfur monochloride stream suitable for use in the present invention can be obtained. Many variations of carbon tetrachloride from carbon disulfide processes are known in the art as shown by the many patents directed to the process. However, all of the processes are characterized by a step in the process wherein carbon tetrachloride is separated from sulfur monochloride. A sulfur monochloride stream containing from about 2 to about 20% carbon tetrachloride is a usual feed material for the process of the present invention. The process of the present invention will be illustrated by the following examples.

EXAMPLE 1

Into a vertical column 24 inches in diameter and 24 feet tall containing 12 feet of 1 and 2 inch saddle packing above 14 shower trays is fed 3,300 pounds per hour of a sulfur monochloride feed at 120°C. containing 7% carbon tetrachloride. The feed entry point is near the top of the column 3 feet below the top of the packed section.

The temperature at the bottom of the column is maintained at 115°C. by means of circulation through a heat exchanger. The gaseous mixture leaving the top of the column passes through 5 feet of bare pipe and any condensation drains back into the column. The temperature at the outlet of the bare pipe is 93°C. Nitrogen enters the column below the liquid level of the sulfur monochloride in the bottom of the column at a rate of 25 standard cubic feet per minute. The overhead from the column is passed through a heat exchanger where the condensables are condensed and the nitrogen is vented to the atmosphere. The sulfur monochloride product contains 0.3% carbon tetrachloride and 2–4% sulfur. About 90% of the sulfur monochloride which enters the column is recovered as underflow product. The remainder of the sulfur monochloride which enters the column is carried out of the column with the stripping gas, is condensed and can be returned to the process to react with additional carbon disulfide.

EXAMPLE 2

Into a heated three-neck distilling flask equipped with a fritted glass sparger, a thermometer and a vertical section of jacketed glass tubing is charged 759 grams of sulfur monochloride containing 9.4% carbon tetrachloride. The vertical jacketed glass tubing is connected to a water cooled condenser followed by a dry ice/acetone cooled condenser and receiver. A thermometer is placed in the line between the jacketed vertical glass tubing and the ice water cooled condenser.

The liquid in the receiver is heated to 129° – 134°C. and nitrogen at the rate of 600 milliliters per minute is sparged into the liquid. The jacketed vertical glass tubing is heated by atmospheric pressure steam passed through the jacket. The gas temperature at the outlet of the jacketed tubing varies between 75° to 95°C. during the test.

The mixture in the distilling flask is sampled periodically and analyzed for carbon tetrachloride. The results of the analysis are as follows:

| Time of Gas Contact Minutes | % $CCl_4$ |
|---|---|
| 0 | 9.4 |
| 30 | 0.20 |
| 60 | 0.037 |
| 90 | < 0.007 |

159 grams of liquid is stripped from the mixture.

EXAMPLE 3

The apparatus of example 2 is charged with 1,175 grams of a sulfur monochloride mixture containing 4.6% carbon tetrachloride. The temperature of the mixture in the flask is maintained at 119° – 124°C. Air at the rate of 620 milliliters per minute is sparged into the liquid. The gas temperature at the exit of the vertical jacketed tubing drops from 95°C. to 64°C. during the course of the experiment.

The liquid mixture in the distilling flask is sampled periodically and analyzed for carbon tetrachloride.

The results of the analysis are as follows:

| Time of Gas Contact Minutes | % $CCl_4$ |
|---|---|
| 0 | 4.6 |
| 30 | 1.23 |
| 60 | 0.56 |
| 85 | 0.35 |

179 grams of liquid is stripped from the mixture.

The examples clearly illustrate the sulfur monochloride containing low levels of carbon tetrachloride contamination are readily obtained by the process of the invention.

What is claimed is:

1. A process for recovering sulfur monochloride from a mixture containing sulfur monochloride and carbon tetrachloride derived from a process for preparing carbon tetrachloride by the chlorination of carbon disulfide which comprises; contacting the mixture containing sulfur monochloride and carbon tetrachloride with a substantially dry inert gas at a temperature between about 70° and about 150°C. to separate carbon tetrachloride from the sulfur monochloride.

2. The process of claim 1 wherein the elevated temperature is between about 70° and 150°C.

3. The process of claim 1 wherein the inert gas is nitrogen.

4. The process of claim 1 wherein the inert gas is air.

5. The process of claim 1 wherein the mixture containing sulfur monochloride and carbon tetrachloride is countercurrently contacted with the inert gas.

6. In a process for preparing carbon tetrachloride by the chlorination of carbon disulfide wherein a mixture containing carbon tetrachloride and sulfur monochloride is produced and the carbon tetrachloride is separated from the sulfur monochloride to produce sulfur monochloride containing from about 2 to about 20% carbon tetrachloride the improvement which comprises contacting the sulfur monochloride containing from about 2 to about 20% carbon tetrachloride with a substantially dry inert gas at a temperature between about 70° and about 150°C. to separate carbon tetrachloride from the sulfur monochloride.

7. The process of claim 6 wherein the sulfur monochloride containing carbon tetrachloride is continuously countercurrently contacted with nitrogen.

* * * * *